(12) United States Patent
Matsui

(10) Patent No.: US 6,204,979 B1
(45) Date of Patent: Mar. 20, 2001

(54) LENS ASSEMBLY AND ECCENTRICITY ADJUSTMENT APPARATUS THEREOF

(75) Inventor: Nobuo Matsui, Omiya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/376,293

(22) Filed: Aug. 18, 1999

(30) Foreign Application Priority Data

Aug. 21, 1998 (JP) .................................................. 10-235549
Aug. 28, 1998 (JP) .................................................. 10-243691

(51) Int. Cl.$^7$ .............................. G02B 7/02; G02B 15/14
(52) U.S. Cl. ........................... 359/819; 359/694; 359/703
(58) Field of Search ..................................... 359/819, 821, 359/813, 704, 703, 694, 822, 823

(56) References Cited

U.S. PATENT DOCUMENTS

| | | | | |
|---|---|---|---|---|
| 4,281,907 | * | 8/1981 | Kamata | 359/700 |
| 4,989,950 | * | 2/1991 | Nakauchi | 359/818 |
| 5,091,802 | * | 2/1992 | Imaoka et al. | 359/694 |
| 5,689,375 | * | 11/1997 | Satoh et al. | 359/699 |
| 5,717,528 | * | 2/1998 | Ihara et al. | 359/694 |
| 5,835,799 | * | 11/1998 | Washisu | 396/55 |
| 5,926,316 | * | 7/1999 | Sugawara | 359/557 |
| 6,104,551 | * | 8/2000 | Matsui | 359/700 |
| 6,130,715 | * | 10/2000 | Matsui et al. | 348/345 |

FOREIGN PATENT DOCUMENTS

| | | | | |
|---|---|---|---|---|
| 61-86740 | * | 5/1986 | (JP) | G02B/7/02 |
| 62-295011 | | 12/1987 | (JP) | G02B/7/02 |
| 4-225307 | * | 8/1992 | (JP) | G02B/7/02 |

* cited by examiner

Primary Examiner—Georgia Epps
Assistant Examiner—Saeed Seyrafi
(74) Attorney, Agent, or Firm—Nixon Peabody LLP; David S. Safran

(57) ABSTRACT

A specific lens with a high sensitivity to an eccentricity is selected from a lens optical system and is provided with a tilting mechanism, which enables the tilt angle of the lens to be adjusted from outside a lens barrel. After lenses are fitted into the lens barrel, the tilting mechanism enables the adjustment of a resolution while the image quality of the lens optical system is observed. A second lens frame for supporting a second lens, which has the greatest effect on the resolution in the lens optical system, is arranged inside a first lens frame. A reference pin and two eccentric pins are provided at regular intervals of 120 degrees on the circumferential surface of the first lens frame. The reference pin and two eccentric pins support the second lens frame from the outside. The pins are inserted into grooves formed in the second lens frame. A projecting part is formed at the outer circumference of the second lens frame, and the projecting part comes into contact with the first lens frame. The second lens frame is tiltable about the projecting part. A tool such as a screwdriver is inserted into a hole of a fixed cylinder to rotate the eccentric pins, thereby adjusting the tilt angle of the second lens.

7 Claims, 15 Drawing Sheets

F I G. 2
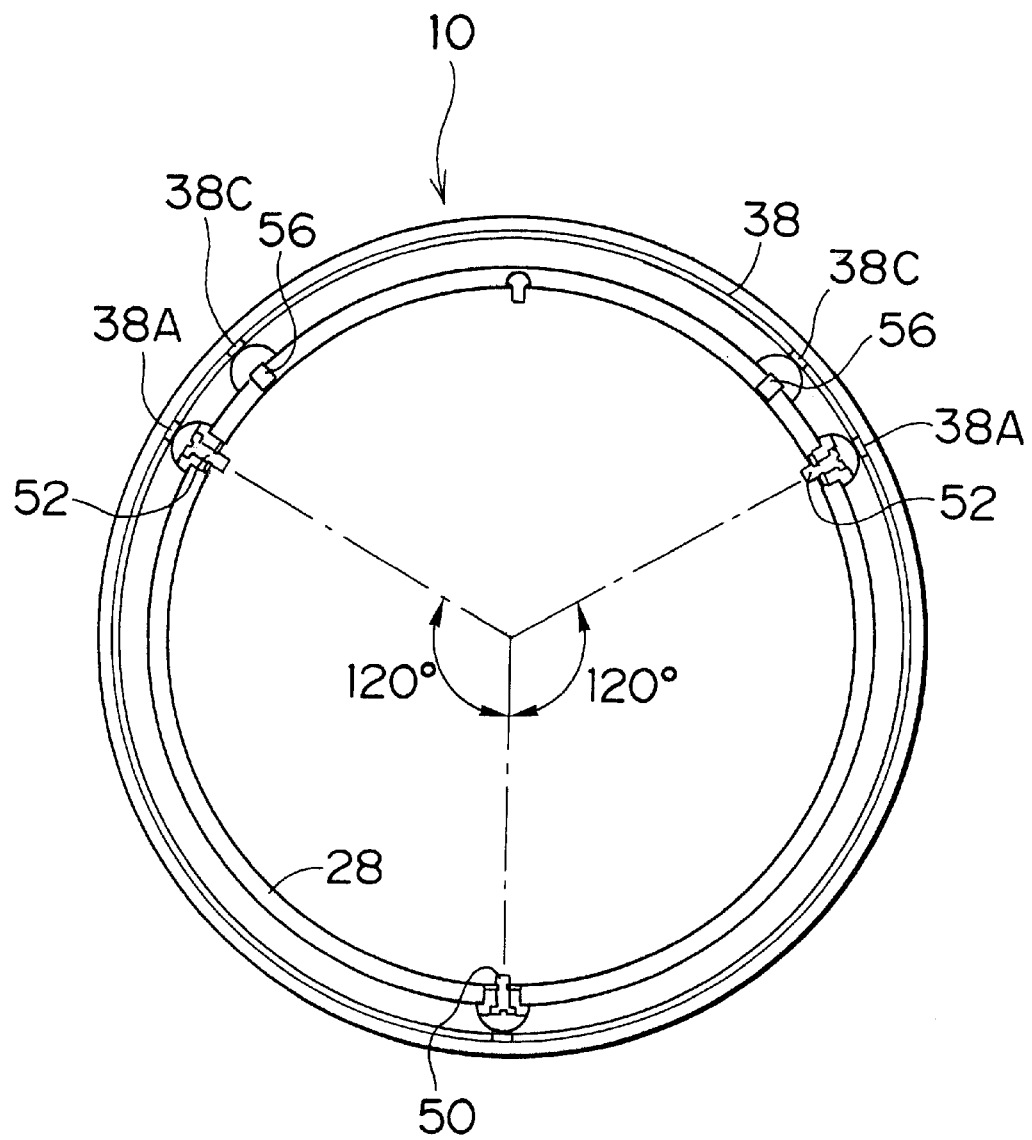

LENS ASSEMBLY AND ECCENTRICITY ADJUSTMENT APPARATUS THEREOF

BACKGROUND OF THE INVENTION

1. Field of the Invention

The present invention relates generally to a lens assembly and an eccentricity adjustment apparatus thereof, and more particularly to a lens assembly provided with a means for adjusting a resolution level in the process of assembling lenses into the lens assembly, and an apparatus for improving a resolution by rotating a specific lens of the lens assembly on the optical axis.

2. Description of Related Art

Generally, in the process of assembling a lens assembly for use in a TV camera or the like, lenses are fitted into a lens barrel, and then a collimator is attached to the end of the lens assembly. The lens assembly is adjusted to increase a resolution level (e.g., Modulation Transfer Function (MTF)) while the image quality of the lens assembly is observed through a microscope.

Conventionally, a front lens is detached and a press ring of a lens that is a subject of the adjustment is loosened and the lens is rotated on the optical axis for adjusting the position of the lens. Alternatively, a unit holding the lens is rotated in order to adjust the position of the lens. These methods, however, require a long period since the lens assembly cannot be adjusted while the image quality of the lens assembly is observed.

In another conventional method, a specific lens of a lens assembly is, supported in such a manner as to move vertically and horizontally within a plane perpendicular to the optical axis, and the lens is moved within the plane by means of screws, which are inserted along the diameter of a lens frame. In addition, Japanese Patent Provisional Publication No. 62-295011 discloses a method of adjusting the optical axis of the lens by means of a special jig before the lenses are fitted into the lens barrel. In these methods, the screws are inserted along the diameter of the lens frame, and thus, the lens frame must be thick and large in diameter.

In view of the foregoing, it is an object of the present invention to provide a lens assembly and an eccentricity adjustment apparatus thereof, which make it possible to easily adjust a lens while the image quality of the lens assembly is observed and also reduces the number of assembly processes.

To achieve the above-mentioned object, the present invention is directed to a lens barrel comprising: a lens; and a tilting mechanism for supporting the lens tiltably with respect to an optical axis; wherein the tilting mechanism adjusts a tilt angel of the lens from the outside of the lens barrel.

According to the present invention, a specific lens, which has a great effect on the resolution with respect to a slight displacement, is selected from the lens optical system and is supported by the tilting mechanism. The tilting mechanism enables the tilt angle of the lens to be adjusted from outside of the lens barrel. After the lenses are fitted into the lens barrel, the lens assembly can be adjusted to achieve a desired lens performance while the image quality of the lens assembly is observed. This reduces the number of assembly processes and makes the lens performance uniform. In addition, there is no necessity of disassembling the lens assembly for the adjustment, and the readjustment can be performed easily.

For example, the tilting mechanism is constructed in such a manner that: the lens is arranged in a cylindrical member; a reference member and a plurality of eccentric members for supporting the lens from the outside are provided on the circumference of the cylindrical member; and connecting parts for connecting to the reference member and the eccentric members are formed at the outer circumference of the lens, the tilting mechanism being able to adjust the tilt angel of the lens by moving the eccentric members. The lens may be fitted in the lens frame, or the lens frame may be integrated with the lens.

To achieve the above-mentioned object, the present invention is directed to a lens barrel, comprising: a lens supported rotatably about an optical axis; an opening formed at the circumference of the lens barrel; and a power transmission mechanism for transmitting a force, applied from the outside of the lens barrel, to the lens through the opening to thereby adjust an eccentricity of the lens.

More specifically, the opening is formed at the circumference of the lens barrel, and the force is transmitted from outside of the lens barrel to the lens within the lens barrel through the power transmission mechanism to thereby rotate the lens about the optical axis and adjust the eccentricity thereof. The lens may be fitted in the lens frame, or the lens frame may be integrated with the lens.

According to the present invention, the lens, which is a subject of the adjustment, can be rotated from outside the lens barrel without detaching the lens from the lens barrel. Therefore, the lens can be adjusted to achieve a desired lens performance while the image quality of the lens assembly is observed.

The lens barrel according to the present invention may employ, for example, the eccentricity adjustment apparatus comprising: a supporting base attached to the circumference of the lens barrel; a rotary member rotatable supported on the supporting base; and a power transmission mechanism for transmitting a rotational force of the rotary member to the lens through the opening of the lens barrel, and rotating the lens in accordance with the rotated mount of the rotary member.

According to the present invention, the supporting base is attached to the circumference of the lens barrel with the lens being fitted in the lens barrel. The rotary member is pivotally supported on the supporting base, and the opening is formed in the lens barrel so that the rotational force of the rotary member can be transmitted to the inside of the lens barrel. The power transmission mechanism transmits the rotational force of the rotary member to the lens, which rotates about the optical axis.

Alternatively, the lens barrel may be characterized in that: the opening is formed along the circumference of the lens barrel; at least one connecting part is formed on the circumference of the lens; a control member is connected to and disconnected from the lens in such a manner that the control member is inserted into and extracted from the connecting part through the opening; and the eccentricity of the lens is adjusted by moving the control member connected to the connecting part along the opening.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a front view showing the structure of a tilting mechanism provided in a lens barrel in FIG. 1;

DETAILED DESCRIPTION OF THE PREFERRED EMBODIMENT

This invention will be described in further detail by way of example with reference to the accompanying drawings.

Figure 1:
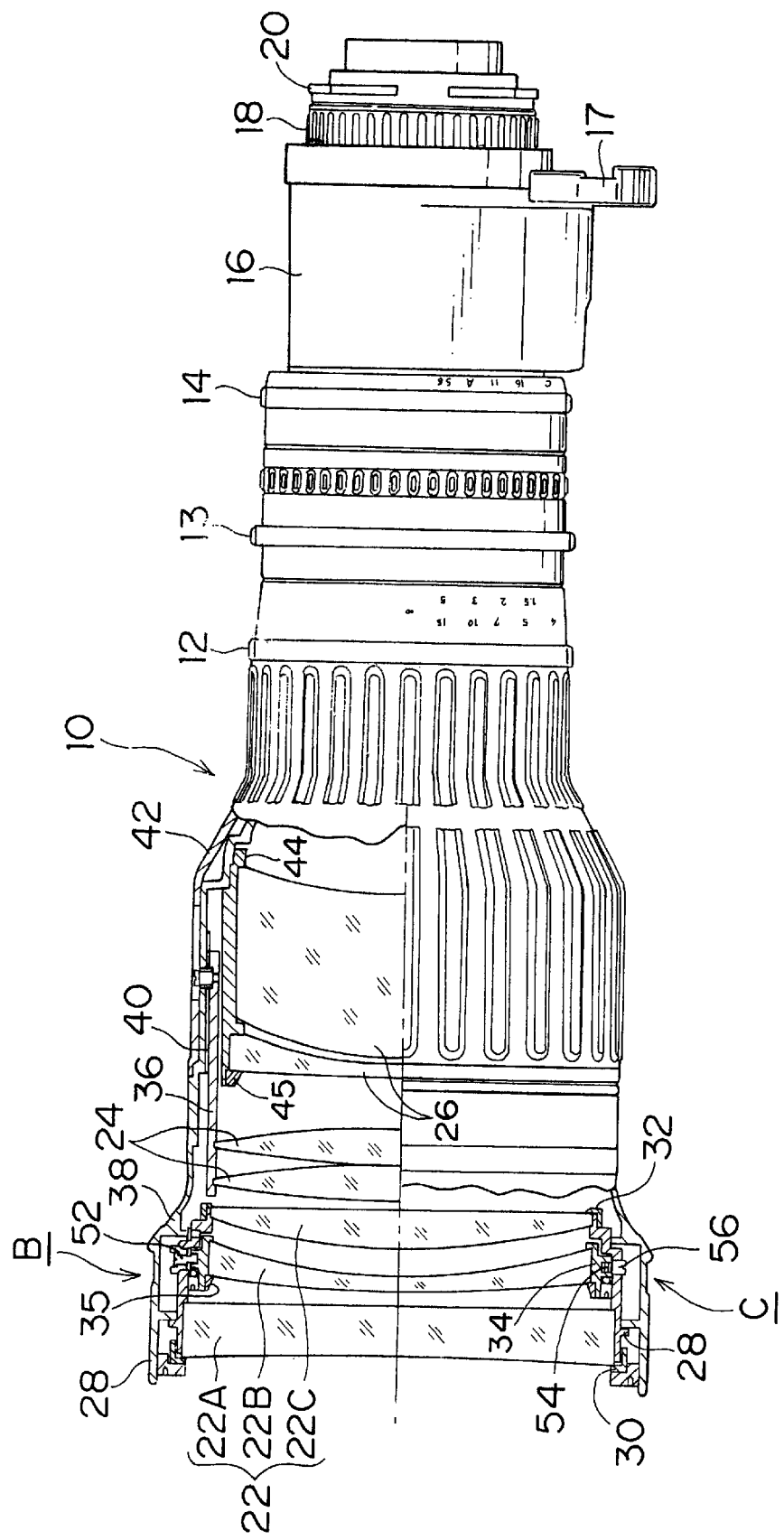
FIG. 1 is a side view including a partial section showing a taking lens assembly for use in a TV camera according to the first embodiment of the present invention.

FIG. 1 is a taking lens assembly for use in a TV camera according to the first embodiment of the present invention. A lens barrel 10 of the taking lens assembly has a focus gear 12, a zoom gear 13 and an iris gear 14. In FIG. 1, reference numeral 16 is an extender unit, 17 is an extender switch lever, and 18 is a flange back adjustment ring. The lens barrel 10 is mounted on a camera body (not shown) through a mount 20.

A front fixed focus lens 22, a movable focus lens 24 and a rear fixed focus lens 26 are disposed in the lens barrel 10. A zoom lens, a diaphragm (an iris), an extender lens and a relay lens (not shown) are arranged behind the rear fixed focus lens 26.

The front fixed focus lens 22 comprises three lenses 22A, 22B and 22C, and the first lens 22A at the forefront is supported at the front end of a 10 cylindrical member or the first lens frame 28 and is fixed by a press ring 30. The first lens frame 28 is also used as a support frame (lens frame) for the third lens 22C. The third lens 22C is supported at the rear end of the first lens frame 28. Reference numeral 32 indicates a press ring for fixing the third lens 22C.

The second lens 22B is supported on the inside of the first lens frame 28 by a second lens frame 34 and a press ring 35. Although described later in further detail, the second lens frame 34 is supported in such a manner as to be tilted with respect to the optical axis of the taking lens assembly by an tilting mechanism, which can be adjusted from outside the lens barrel 10. The second lens frame 34 may be integrated with the lens 22B.

The movable focus lens 24 comprises two lenses and is supported in a movable lens frame 36. The movable lens frame 36 is supported on the inside of a fixed cylinder 38 through a helicoid mechanism 40 so that it can move forward and backward (leftward and rightward in FIG. 1) along the optical axis.

The rotation of the focus gear 12 rotates a cam cylinder 42 and moves the movable focus lens 24 forward and backward to thereby adjust the focus.

The rear fixed focus lens 26 comprises two lenses and is supported by a lens frame 44 and a press ring 45. The lens frame 44 is arranged inside the movable lens frame 36 and is supported by the fixed cylinder 38. The structure and number of focus lenses are not restricted to those described with reference to FIG. 1.

Figure 3:
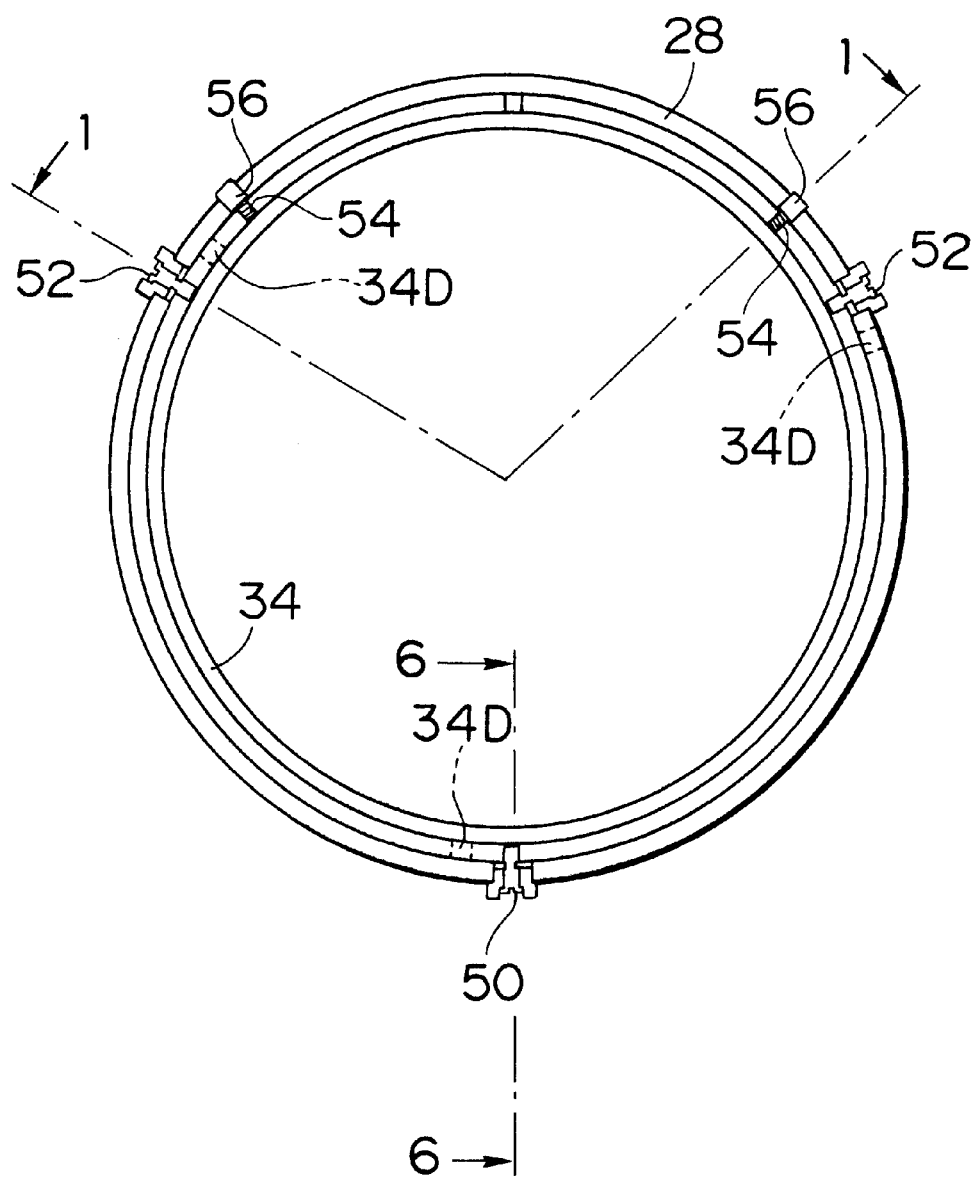
FIG. 3 is a front view showing the structure of the tilting mechanism provided in the lens barrel in FIG. 1.

FIGS. 2 and 3 are front views showing how the second lens frame 34 is supported (i.e., the structure of the tilting mechanism). FIG. 2 does not show the second lens frame 34, and FIG. 3 does not show the fixed cylinder 38. The section in FIG. 1 is along a line 1—1 in FIG. 3.

As shown in FIG. 2, a reference member or pin 50 is provided at the bottom end of the first lens frame 28. A pair of eccentric members or pins 52 are symmetrically arranged at angles of 120 degrees with respect to the reference pin 50. As shown in FIG. 3, a pair of elastic members or springs 54 for preventing the looseness in a radial direction of the second lens frame 34 and a pair of spring press screws 56 for pressing the ends of the springs 54 from the outside are provided in a plane in which the reference pin 50 and the eccentric pins 52 are arranged.

Figure 4:
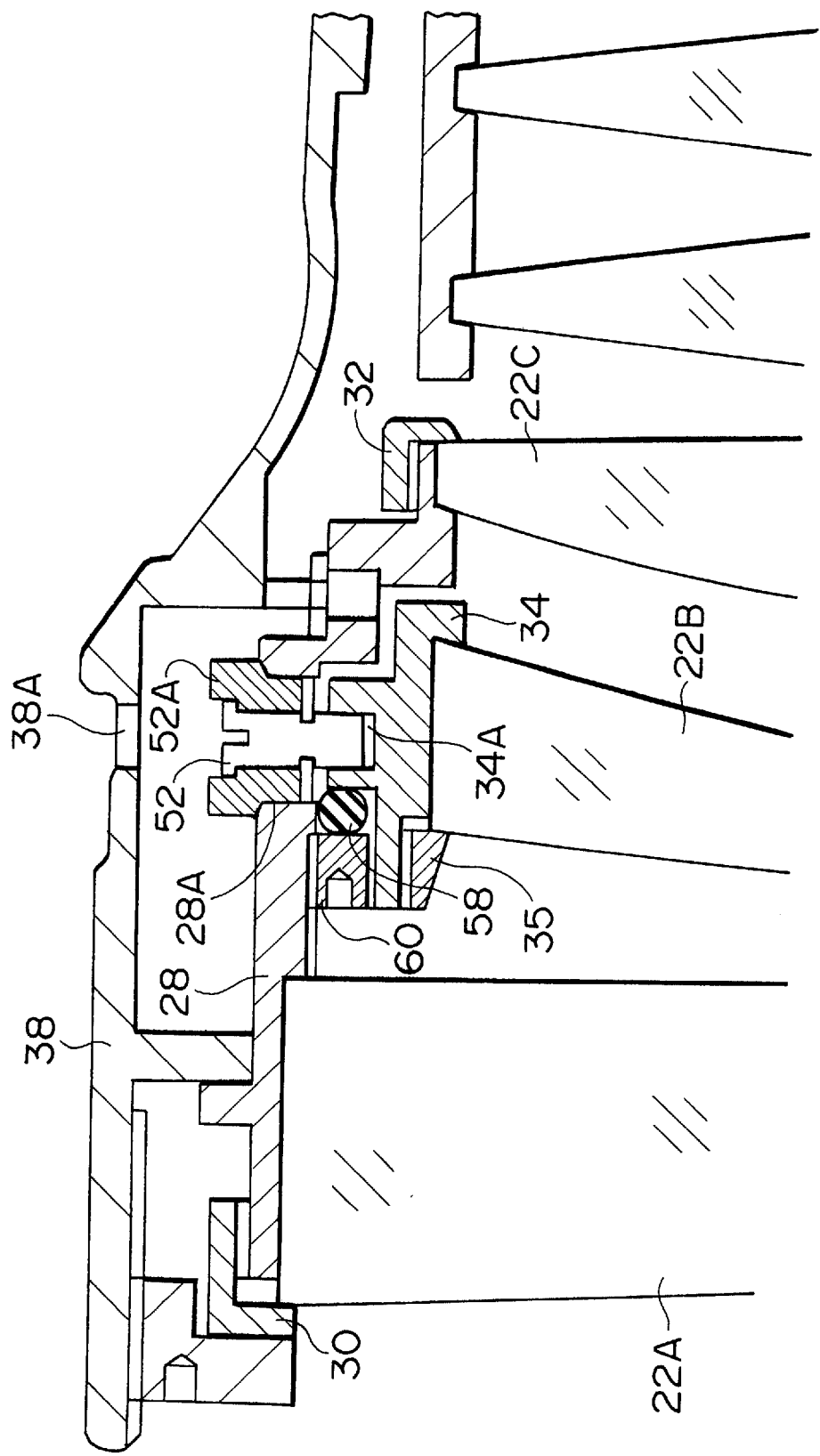
FIG. 4 is an enlarged view of a part B in FIG. 1.
Figure 5:
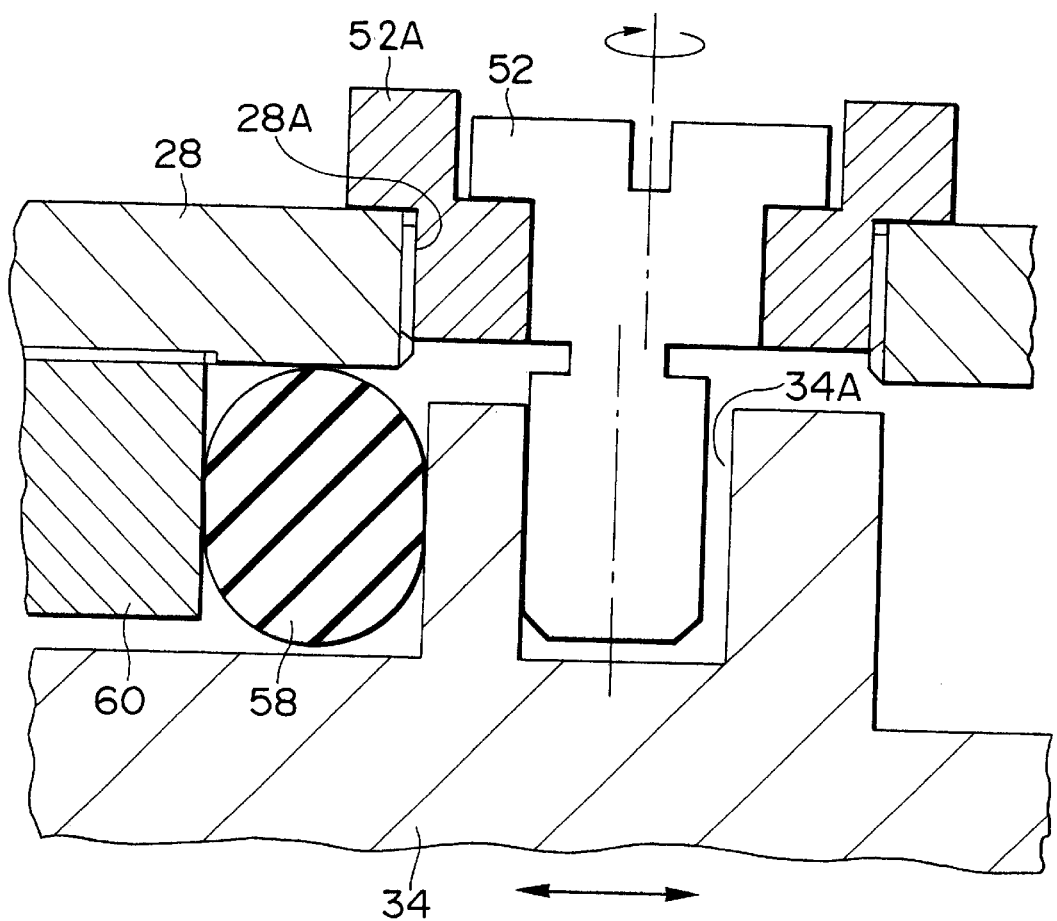
FIG. 5 is a detail drawing showing an essential part in FIG. 4.

FIG. 4 is an enlarged view of a part B in FIG. 1, and FIG. 5 is a detail drawing showing an essential part of FIG. 4. A bearing 52A of the eccentric pin 52 is engaged with a threaded hole 28A of the first lens frame 28, and the eccentric pin 52 is fitted in the bearing 52A. The end of the eccentric pin 52 is fitted in a connecting part or groove 34A formed in the second lens frame 34. An O-ring 58 is arranged outside the front wall of the groove 34A (the left of the groove 34A in FIG. 4), and the O-ring 58 is pressed tightly between the front wall of the groove 34A and a press ring 60. The press ring 60 is engaged with the inner peripheral surface of the first lens frame 28. Tightening the press ring 60 deforms the O-ring 58, and an elastic force of the O-ring 58 presses the end of the eccentric pin 52 to the front wall of the groove 34A (the left side of the groove 34A in FIG. 4). Another elastic member may be used instead of the O-ring 58.

A hole 38A is formed in the fixed cylinder 38 at a position over the eccentric pin 52 as shown in FIG. 4. A tool (e.g. a screwdriver) can be inserted into the hole 38A to rotate the eccentric pin 52, so that the eccentric pin 52 can be rotated from the outside of the fixed cylinder 38.

Figure 6:
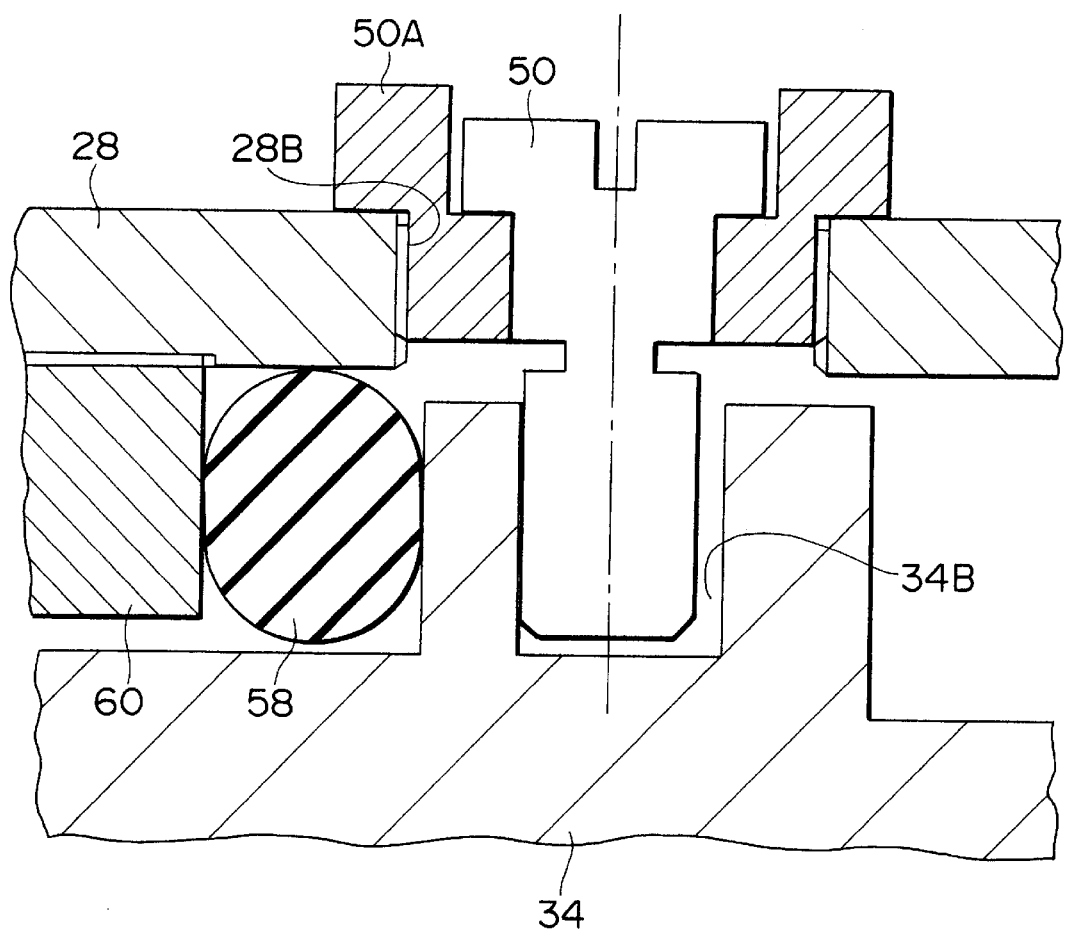
FIG. 6 is an enlarged sectional view showing a reference pin in FIG. 3.

FIG. 6 is an enlarged sectional view around the reference pin 50 along a line 6—6 in FIG. 3. A bearing 50A of the reference pin 50 is engaged with the threaded hole 28A formed in the first lens frame 28, and the reference pin 50 is fitted in the bearing 50A. The end of the reference pin 50 is fitted in a groove 34B formed in the second lens frame 34. The O-ring 58 and the press ring 60 press the reference pin 50 to one side of the groove 34B to thereby eliminate the looseness of the second lens frame 34 as described with reference to FIG. 5.

Figure 7:
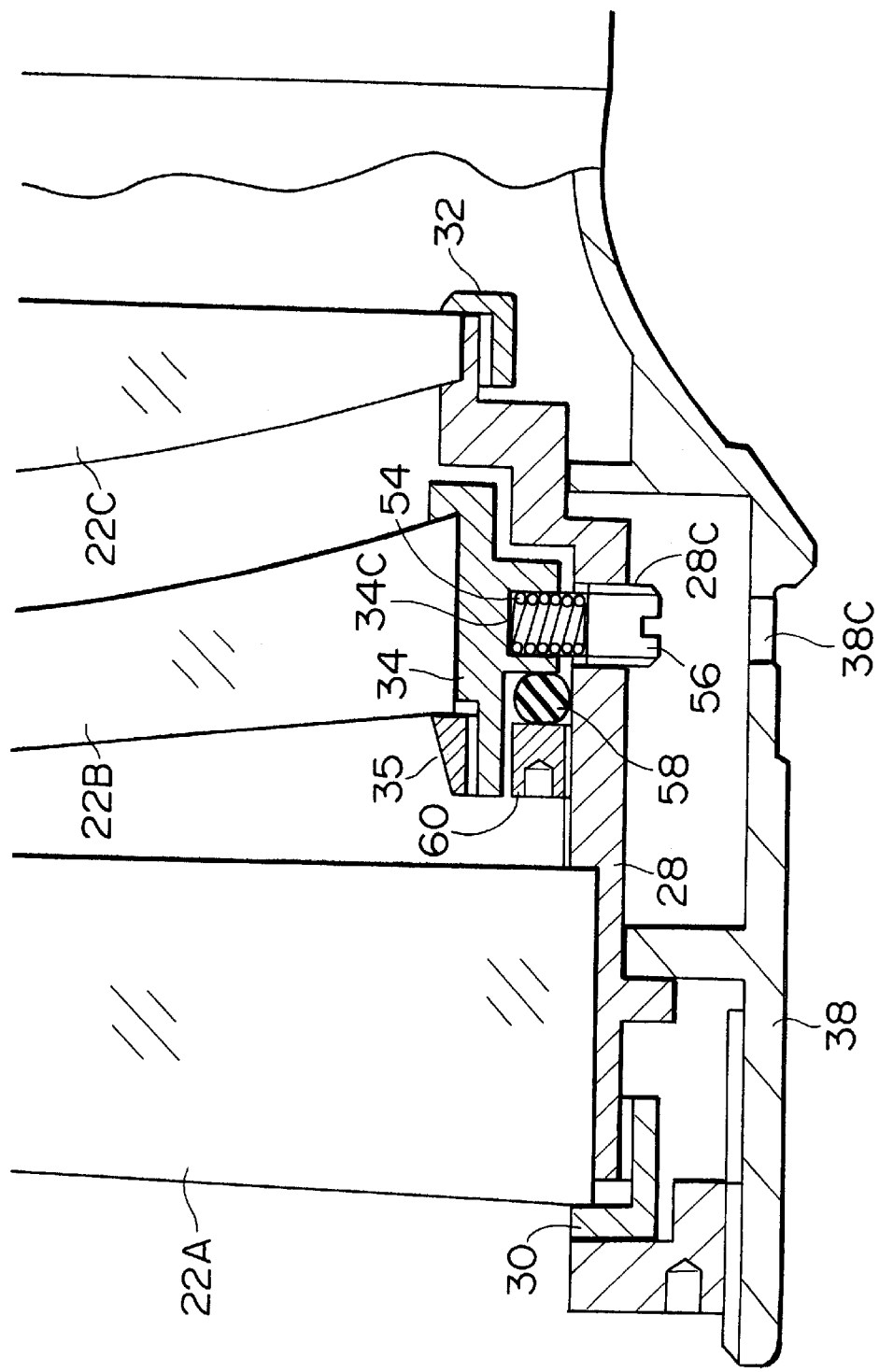
FIG. 7 is an enlarged view of a part C in FIG. 1.

FIG. 7 is an enlarged view of a part C in FIG. 1. The spring 54 is inserted into a groove 34C formed in the second lens frame 34, and the spring press screw 56 is engaged with a threaded hole 28C of the first lens frame 28. A hole 38C is formed in the fixed cylinder 38 at a position over the spring press screw 56. A tool (e.g. a screwdriver) can be inserted into the hole 38C to rotate the spring press screw 56, so that the spring press screw 56 can be rotated from the outside of the fixed cylinder 38. Tightening the spring press screw 56 contracts the spring 54, and an elastic force of the spring 54 eliminates the looseness of the second lens frame 34 with respect to the pins 50 and 52 in the radial direction of the first lens frame 28.

Figure 8:
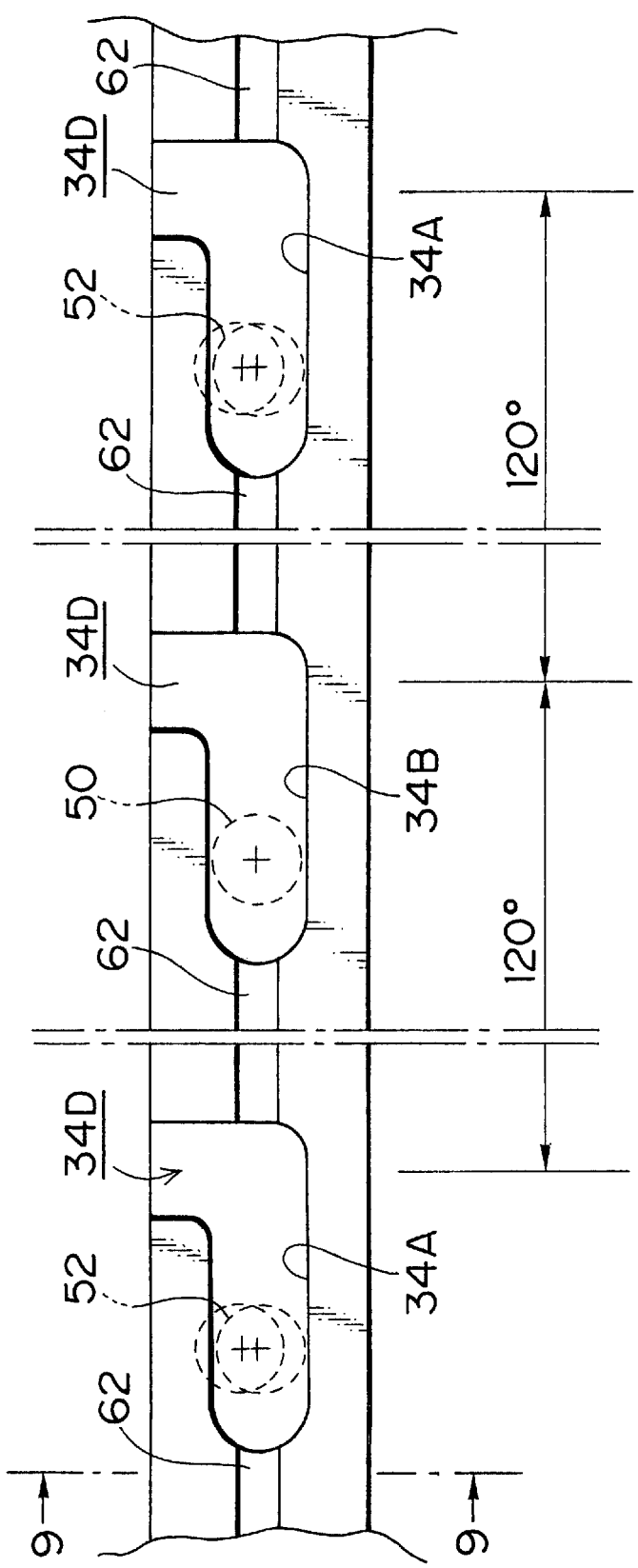
FIG. 8 is a development of grooves formed at the outer circumference of a second lens frame in FIG. 1.

FIG. 8 is a development of the second lens frame 34 showing the grooves 34A and 34B formed in the second lens frame 34. The front side of the taking lens assembly is shown at the lower part of FIG. 8. The grooves 34A and 34B are L-shaped as shown in FIG. 8, and the reference pin 50 and the eccentric pins 52 are inserted into the grooves 34B, 34A, respectively. The grooves 34A and 34B are opened at groove parts 34D toward the back of the taking lens assembly (upward in FIG. 8). The grooves 34A and 34B are of the same shape, and they are formed at intervals of 120 degrees along the circumference of the second lens frame 34.

The pins 50 and 52 are moved relatively to and along the L-shaped grooves 34B and 34A by rotating the second lens frame 34 along the circumference and pulling it toward the front of the taking lens assembly. This separates the second lens frame 34 from the first lens frame 28 without detaching the reference pin 50 and the eccentric pins 52 (i.e. in the state wherein the reference pins 50 and the eccentric pins 52 are projecting from the inner circumference of the first lens frame 28).

The second lens frame 34 can be inserted into the first lens frame 28 in reverse order. In this case, the second lens frame 34 can be rotated on the optical axis by 120 degrees at a time because the grooves 34A and 34B are formed at intervals of 120 degrees along the outer circumference of the second lens frame 34.

Figure 9:
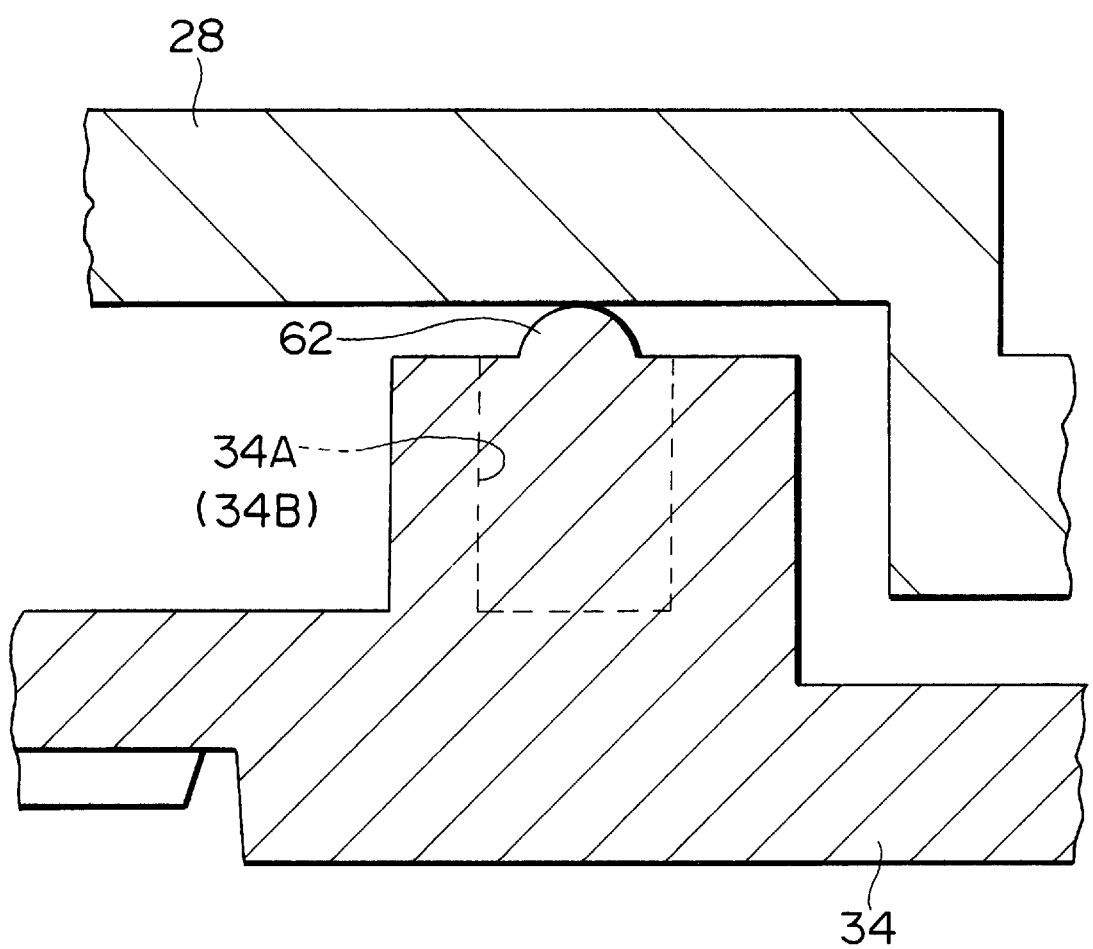
FIG. 9 is a sectional view taken along a line 9—9 in FIG. 8.

FIG. 9 is a sectional view taken along a line 9—9 in FIG. 8. Projections 62 as well as the grooves 34A and 34B are continuously formed along the outer circumference of the second lens frame 34 so that the projections 62 can be in the same plane with the reference pin 50. The second lens frame 34 tilts with the projections 62 abutting on the inner circumference of the first lens frame 28. The projections 62 are formed almost at the center of the second lens frame 34 along the width. The section of each projection 62 may be either semicircle convex, or rectangle.

The second lens 22B of the front fixed focus lens 22 has the tilting mechanism in this embodiment; however, a lens to be provided with the tilting mechanism can be selected from the multiple lenses of the lens assembly. More specifically, a lens of which eccentricity effects the resolution (more preferably, a lens of which eccentricity has the greatest effect on the resolution) is decided as being a subject of the adjustment. It is possible to find a lens with a high sensitivity to the eccentricity by the well-known optical simulation. In accordance with the simulation result, the tilting mechanism is provided to the lens with the high sensitivity to the eccentricity.

A description will now be given of the adjustment at the assembly of the taking lens assembly, which is constructed in the above-mentioned manner. After the lenses are fitted into the lens barrel 10, a well-known collimator (not shown) is attached to the front end of the lens barrel 10. The image quality of the lens assembly is observed through a microscope. At the same time, the tool is inserted into the hole 38A of the fixed cylinder 38 to rotate the eccentric pins 52, thereby adjusting the tilt angle of the second lens 22B. The rotation of the eccentric pin 52 slides the second lens frame 34 horizontally in FIG. 5. At this time, the reference pin 50 fixes the bottom end of the second lens frame 34, and thus, the second lens frame 34 tilts from a plane vertical to the optical axis with the projections 62 in FIG. 9 abutting on the inner circumference of the first lens frame 28.

As described with reference to FIGS. 2 and 3, rotating the two eccentric pins 52 adjusts the tilt angle of the second lens 22B to a desired angle by combining horizontal angle and vertical angle of the second lens 22B. Adjusting the tilt angle of the second lens 22B hardly moves the central axis of the second lens 22B, and this prevents the shift of the optical axis. Thus, the resolution can be improved to the maximum value with the image quality being observed at all times.

As described with reference to FIG. 8, the second lens frame 34 has the L-shaped grooves 34A and 34B, and hence, the second lens frame 34 can easily be detached from the first lens frame 28 without detaching the reference pin 50 and the eccentric pins 52 from the first lens frame 28. For this reason, the second lens frame 34 can be re-attached to the first lens frame 28 after rotating the second lens frame 34 about the optical axis by 120 degrees at a time. After the adjustment of the tilt angle of the second lens 22B, rubber covers or the like may over the holes 38A and 38C of the fixed cylinder 38.

In the first embodiment, the eccentric pins 52 are used as the eccentric members, and the rotation of the eccentric pins 52 adjusts the tilt angle of the lens 22B. The present invention, however, should not be restricted to this. The tilt angle of the lens may be adjusted by changing the inclination of the eccentric members or sliding the eccentric members.

Figure 10:
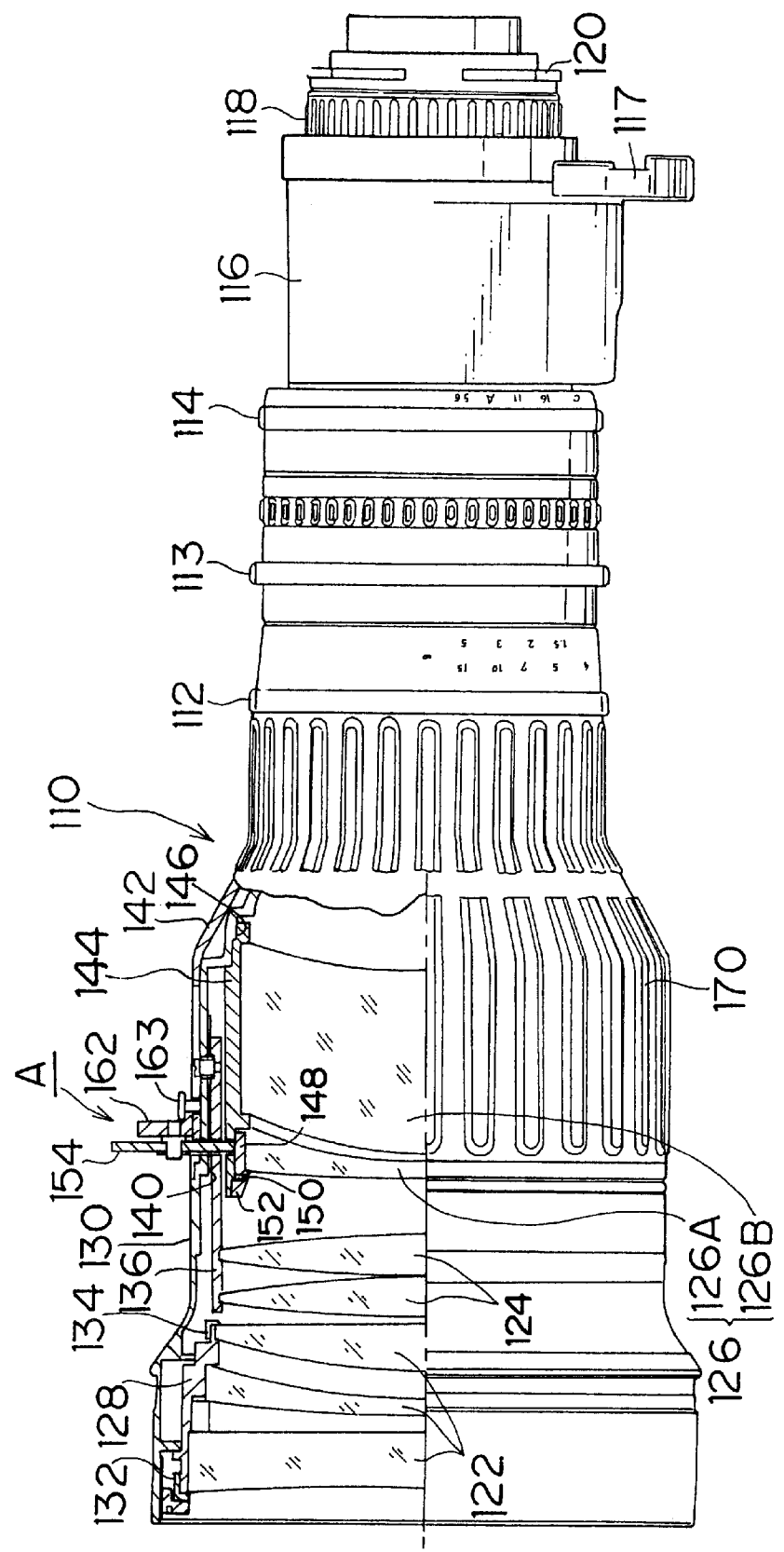
FIG. 10 is a side view including a partial section showing a taking lens assembly for use in a TV camera according to the second embodiment of the present invention.

FIG. 10 shows a taking lens assembly for use in a TV camera according to the second embodiment of the present invention. The lens barrel 110 of the taking lens assembly has a focus gear 112, a zoom gear 113 and an iris gear 114. In FIG. 10, reference numeral 116 indicates an extender unit, 117 is an extender switch lever and 118 is a flange back adjustment ring. The lens barrel 110 is mounted on a camera body (not shown) through a mount 120.

A front fixed focus lens 122, a movable focus lens 124 and a rear fixed focus lens 126 are provided in the lens barrel 110. A zoom lens, a diaphragm (an iris), an extender lens and a relay lens are arranged behind the rear fixed focus lens 126.

The front fixed focus lens 122 comprises three lenses, which are fitted in a lens frame 128 and are supported on the inside of a fixed cylinder 130. Reference numerals 132 and 134 indicate press rings for fixing the lenses.

The movable focus lens 124 comprises two lenses, which are fitted in a movable lens frame 136. The movable lens frame 136 is supported on the inside of the fixed cylinder 130 through a helicoid mechanism 140 so that it can freely move forward and backward (horizontally in FIG. 10) along the optical axis. The rotation of the focus gear 112 rotates a cam cylinder 142 and moves the movable focus lens 124 forward and backward, thereby adjusting the focus.

The rear fixed focus lens 126 comprises a first lens 126A and a second lens 126B. A lens frame 144 for holding the rear fixed focus lens 126 connects to the fixed cylinder 130 through a threaded part 146. A lens frame 148 holding the first lens 126A is rotatably supported on the inside of the lens frame 144 by a corrugated plate spring 150 and a press ring 152. Although the structure of the lens frame 148 will be described later in detail with reference to FIGS. 11 and 12, a gear 148A is formed on the whole peripheral surface of the lens frame 148. The rotation of a rotary member 154, which is engaged with the gear 148A, rotates the first lens 126A on the optical axis, thereby adjusting the eccentricity of the first lens 126A (see FIGS. 11 and 12). The structure and number of focus lenses are not restricted to those described with reference to FIG. 10. The lens frame 148 may be integrated with the first lens 126A.

Figure 11:
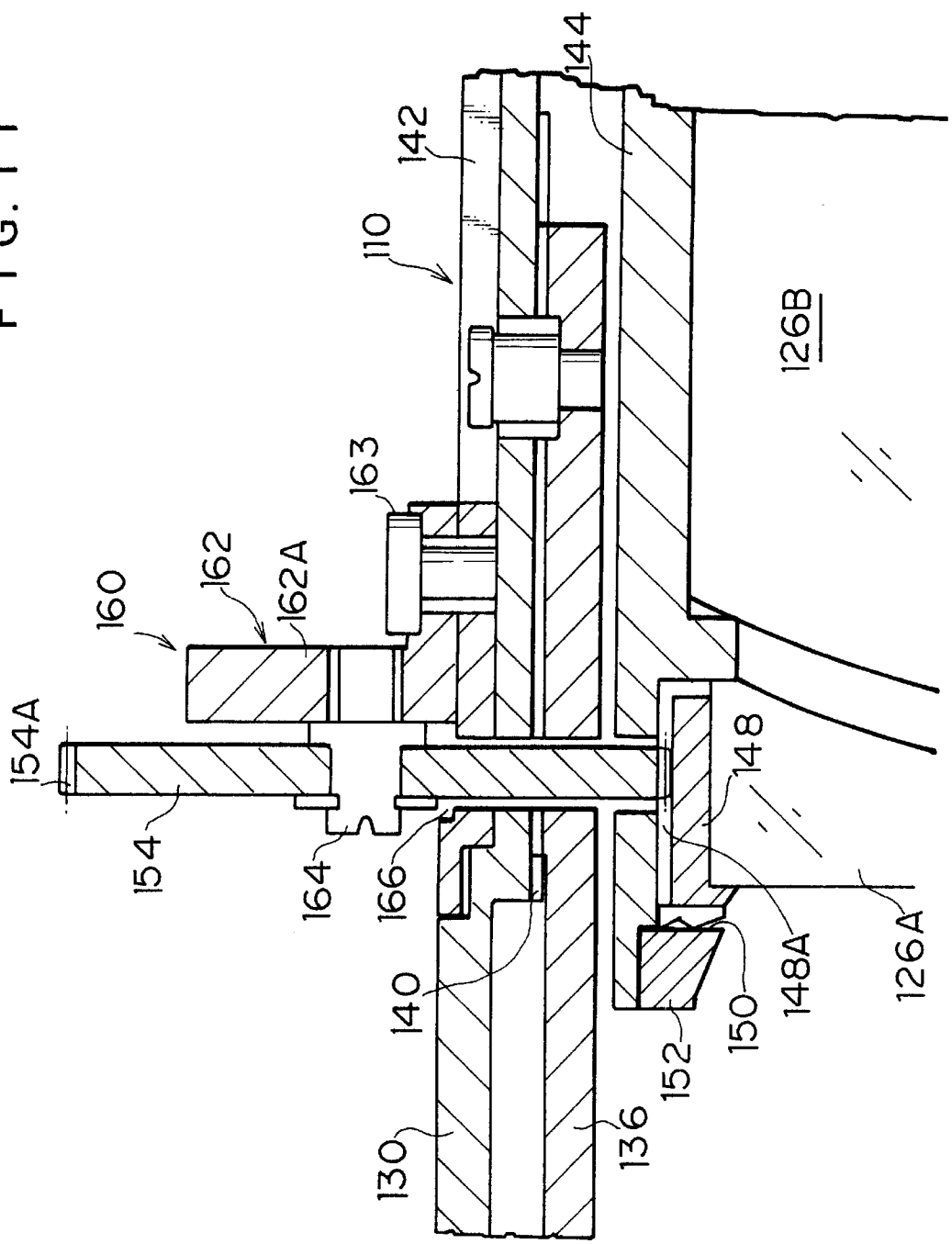
FIG. 11 is an enlarged view of a part A in FIG. 10.
Figure 12:
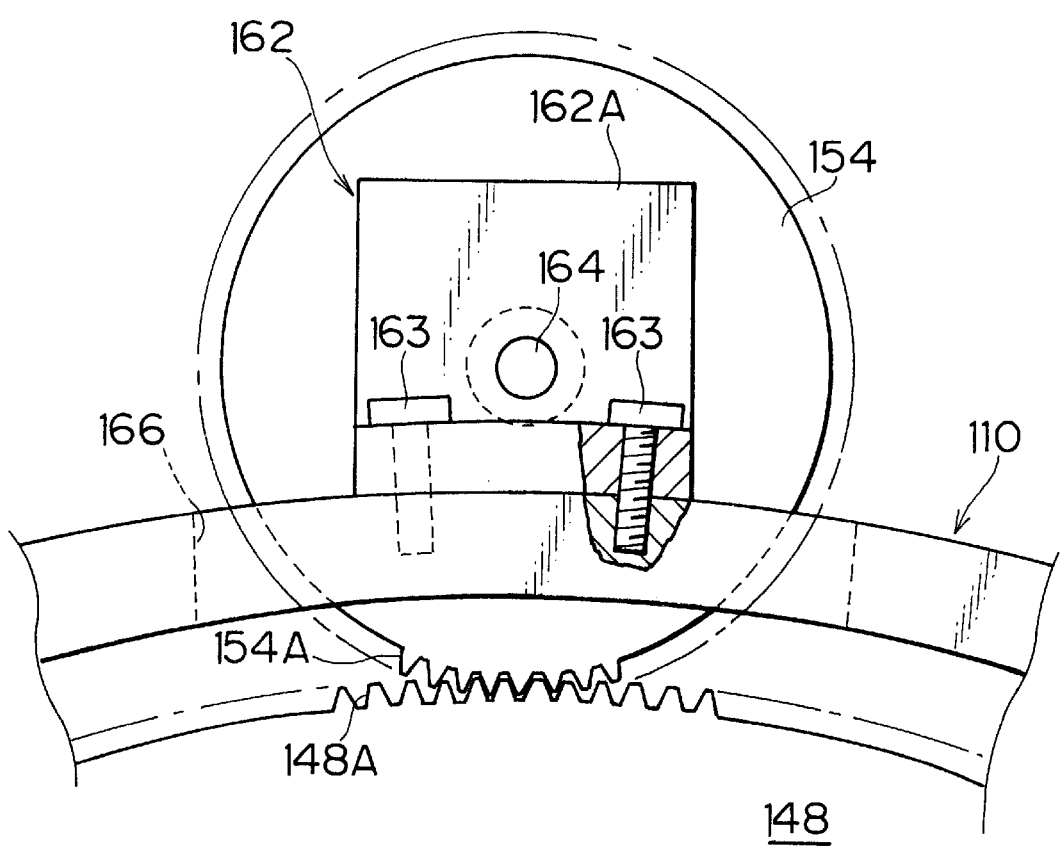
FIG. 12 is a back view showing an eccentricity adjustment apparatus including a rotary member in FIG. 11.
Figure 13:
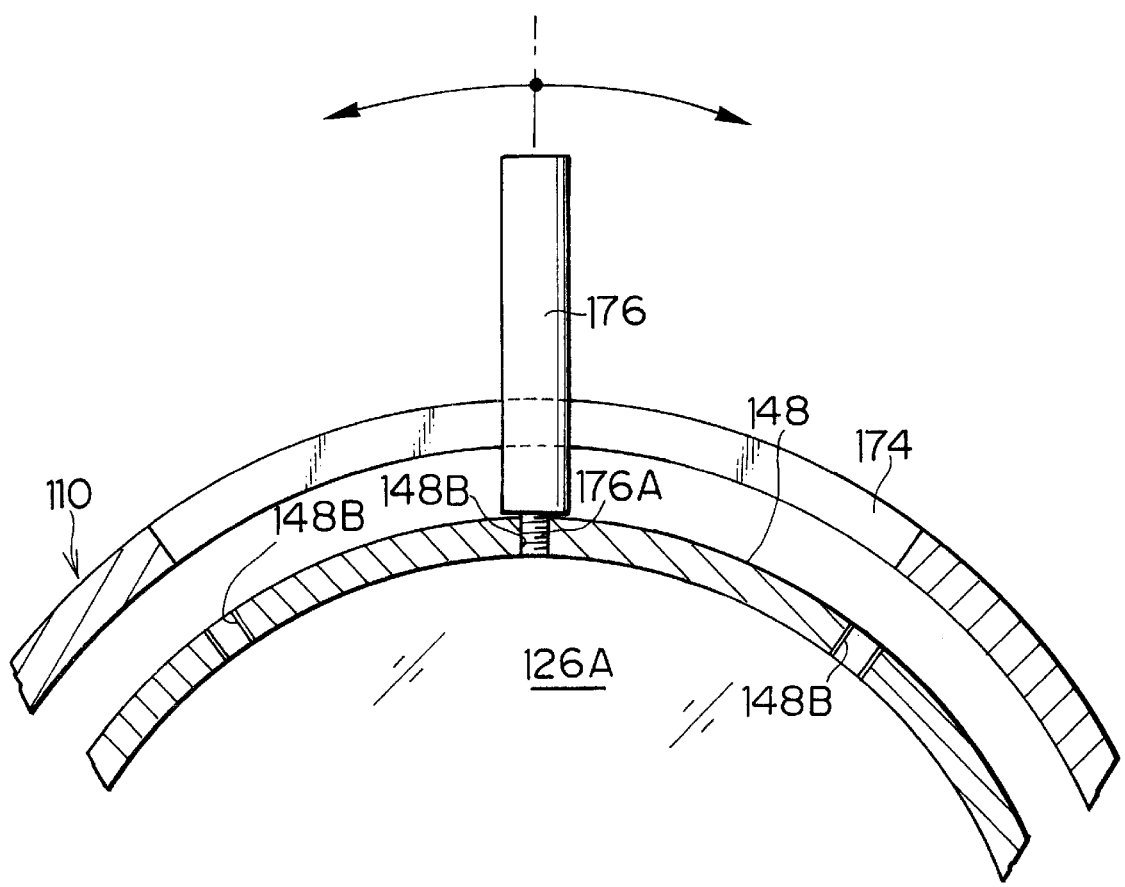
FIG. 13 is a sectional view showing an essential part of the third embodiment of the present invention.
Figure 14:
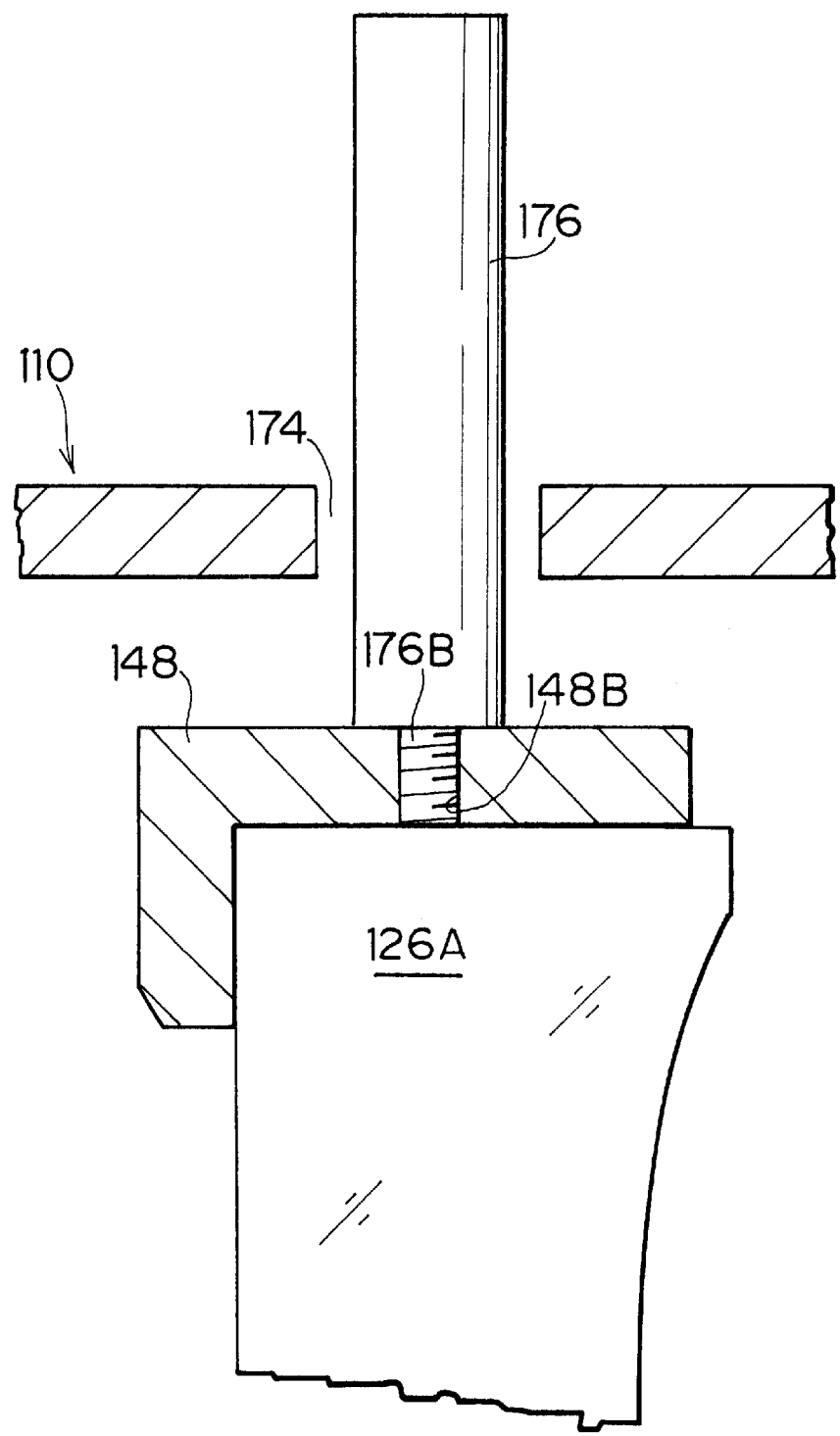
FIG. 14 is an enlarged side sectional view showing a structure in FIG. 13.
Figure 15:
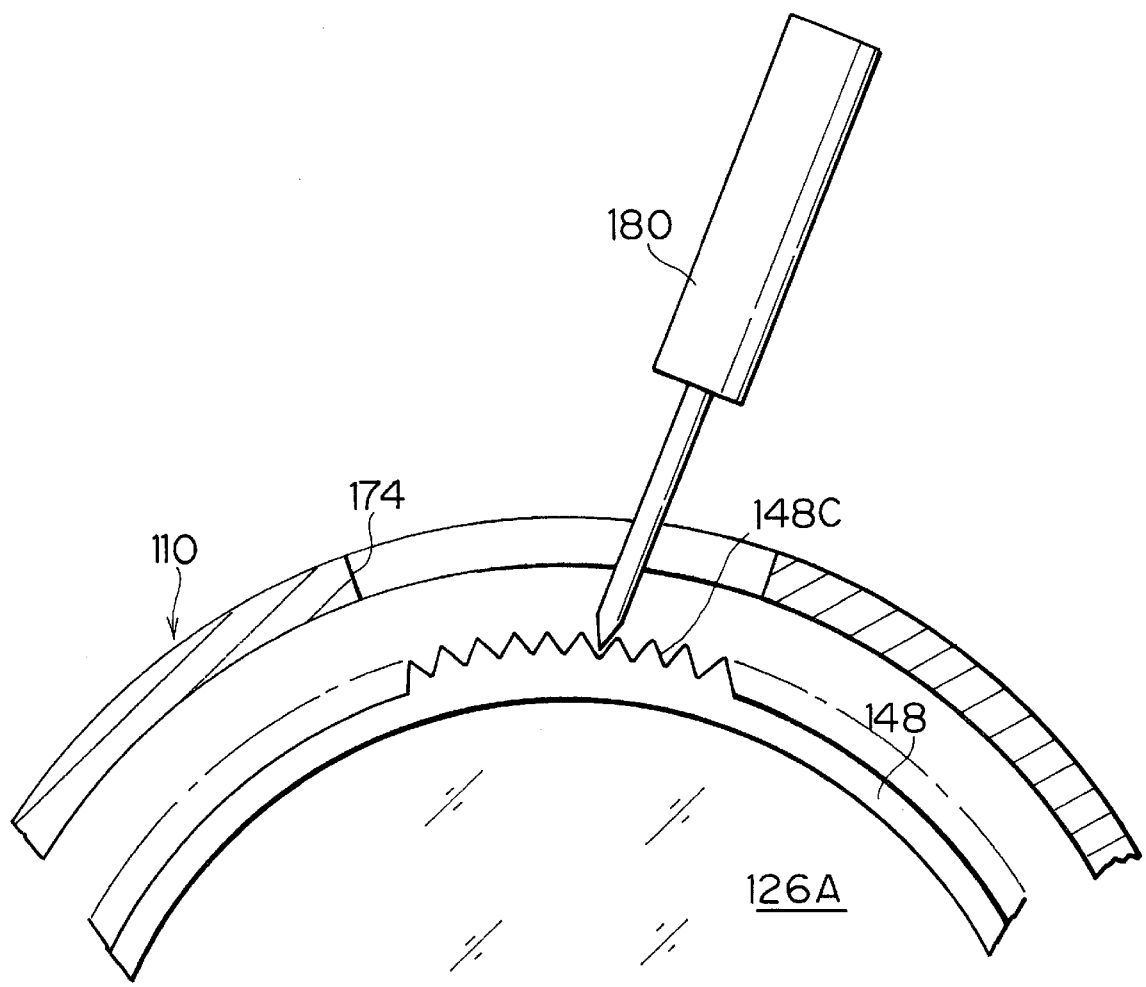
FIG. 15 is a sectional view showing another embodiment of the present invention.

FIG. 11 is an enlarged view of a part A in FIG. 10. FIG. 12 is a perspective back view of the rotary member 154 in FIG. 11 taken from behind the lens assembly. To simplify the illustration, the cam cylinder 142, the fixed cylinder 130 and the movable lens frame 136 are not shown as being fitted into the lens barrel 110, and the lens frame 144 is not shown (FIGS. 13–15 are simplified in the same way).

As shown in FIGS. 11 and 12, an eccentricity adjustment apparatus 160 according to this embodiment comprises the rotary member 154 and a supporting base 162 for supporting the rotary member 154. A gear 154A is formed along the whole circumference of the rotary member 154, and the supporting base 162 is fixed on the circumference of the lens barrel 110 by a fixing screw 163. A rotary shaft 164 of the rotary member 154 is supported on a standing part 162A. of the supporting base 162, and the rotary shaft 154 is capable of rotating within a plane perpendicular to the optical shaft.

On the other hand, an opening 166 is formed in the lens barrel 110 so that the rotary member 154 can be inserted into the opening 166. The gear 154A of the rotary member 154 is engaged with the gear 148A of the lens frame 148 through the opening 166. The opening 166 is composed of opening parts, which are equally formed at corresponding positions of the cam cylinder 142, the fixed cylinder 130 and the lens frame 144.

A description will now be given of the operation of the lens barrel and the eccentricity adjustment apparatus thereof.

After the lenses are fitted into the lens barrel 110, the rotary member 154 is inserted into the opening 166 of the lens barrel 110, and the supporting base 162 is attached to the lens barrel 110 with the fixing screw 163. About that time, a well-known collimator (not shown) is attached to the front end of the lens barrel 110, and the image quality of the lens assembly is observed through a microscope. The rotary member 154 is rotated to rotate the first lens 126A while the image quality is being observed in order to achieve a desired level of the lens performance.

A rotational force of the rotary member 154 is transmitted to the lens frame 148 through the gears 154A and 148A. The lens frame 148 is normally forced along the optical axis by the corrugated plate spring 150 so that it can be fixed steadily. When the rotary member 154 applies the rotational force to the lens frame 148 along the circumference, the contacting surface between the lens frame 148 and the corrugated plate spring 150 slides. Consequently, the lens frame 148 rotates in accordance with the rotated amount of the rotary member 154. Thus, the resolution can be improved to the maximum while the image quality of the lens is observed at all times. An elastic member such as rubber may be used instead of the corrugated plate spring 150.

On completion of the eccentricity adjustment, the fixing screw 163 is unfastened in order to detach the eccentricity adjustment apparatus 160 from the lens barrel 110. After the detachment of the rotary member 154, the fixed cylinder 130 is covered with a rubber cover 170 to close the opening 166.

As stated above, the eccentricity adjustment apparatus 160 can easily be attached to the lens barrel 110 as the need arises, and the lens subject to the adjustment (the first lens 126A in this embodiment) can easily be rotated from the outside of the lens barrel 110. It is therefore possible to find the optimum position of the lens while observing the image quality of the lens assembly, and this simplifies the adjustment. The lens assembly can be adjusted without disassembling the lens barrel 110, and thus, the lens assembly can be readjusted easily.

In this embodiment, the first lens 126A of the rear fixed focus lens 126 is the subject of the eccentricity adjustment, but it is possible to freely select a lens as the subject of the adjustment. More specifically, a lens of which eccentricity effects the resolution (more preferably, a lens of which eccentricity has the greatest effect on the resolution) is selected from the lens optical system. A lens with a high sensitivity to the eccentricity can be found by the well-known optical simulation. A lens with a high sensitivity to the eccentricity is decided as being the subject of the adjustment in accordance with the simulation result.

In the second embodiment, the rotational force of the rotary member 154 is transmitted to the lens frame 148 through the gears 154A and 148A, but the present invention should not be restricted to this. The rotational force of the rotary member 154 may also be transmitted through a gear train of more gears. A friction transmission mechanism may be used instead of the gear transmission mechanism.

In the second embodiment, the supporting base 162 is attached to the lens barrel 110 with the fixing screw 163, but the present invention should not be restricted to this. The supporting base 162 may also be attached to the lens barrel 110 with a fitting means or a magnet means. It is possible to use any means in which the supporting base 162 can be fixed steadily and can be attached and detached easily.

In the second embodiment, the gear transmission mechanism transmits the rotational force of the rotary member 154 to the first lens 126A to adjust the eccentricity; however, the present invention should not be restricted to this. It is also possible to use the structure described below in order to rotate the lens subject of the eccentricity adjustment (the first lens 126A in the embodiment) about the optical axis.

FIGS. 13 and 14 are sectional views showing an essential part of the third 5 embodiment. FIG. 13 is a front view, and FIG. 14 is a side view. As shown in FIGS. 13 and 14, an opening 174 with a certain length (e.g. ¼, 1/3 or ½ of the circumference) is formed in the lens barrel 110, and threaded holes 148B (equivalent to a connecting part and a power transmission mechanism) are formed at the circumference of the lens frame 148 for supporting the first lens 126A subject of the eccentricity adjustment.

The threaded holes 148B are formed at least one position and more preferably at plural positions along the circumference of the lens frame 148, and a screw part 176A of a control member 176 (equivalent to a power transmission mechanism) is inserted into the threaded hole 148B through the opening 174.

If the control member 176 connected to the threaded hole 148B is moved along the opening 174, the first lens 126A is rotated on the optical axis. Repeating this operation while changing the threaded holes 148B connected to the control member 176 rotates the first lens 126A to a desired position. On completion of the eccentricity adjustment, the control member 176 is detached from the lens frame 148 and the opening 174 is covered with a rubber cover (not shown in FIGS. 13 and 14) or the like.

Instead of the structure in which the control member 176 is engaged with the threaded hole 148B of the lens frame 148, the end of the control member 176 may only be inserted into a hole (equivalent to the connecting part and the power transmission mechanism) of the lens frame 148.

Alternatively, as shown in FIG. 15, a gear-shaped uneven part 148C (equivalent to the connecting part and the power transmission mechanism) may be formed along the whole circumference of the lens frame 148, and a long and thin rod-shaped tool (equivalent to a control member) 180 may be inserted into the opening 174 of the lens barrel 110 toward the uneven part 148C. When the tip of the tool 180 is brought into contact with the uneven part 148C and applies a rotational force to the uneven part 148C, the first lens 126A rotates on the optical axis. The opening 174 should be formed in such a size as to enable the tool 180 to be operated properly. Repeating this operation while changing the positions where the tool 180 is in contact with the uneven part 148C rotates the first lens 126A to a desired position.

The above-described structure simplifies the adjustment since the optimum position can be found while the image quality of the lens is being observed.

In the first through third embodiments, the present invention is applied to the eccentricity adjustment apparatus of the taking lens assembly for use in the TV camera, but the present invention may also be applied to various kinds of lens assemblies.

As set forth hereinabove, the lens barrel according to the present invention tiltably supports a specific lens of which eccentricity has the greatest effect on the resolution in the lens optical system, by means of the tilting mechanism so that the tilt angle of the lens can be adjusted from the outside of the lens barrel. This simplifies the adjustment in and reduces the number of processes for assembling the lens barrel. Moreover, the eccentricity of the lens can be adjusted without disassembling the lens barrel, and therefore, the eccentricity can be easily readjusted.

The lens barrel and the eccentricity adjustment apparatus thereof according to the present invention rotates the lens, rotatably provided in the lens barrel, on the optical axis by applying the force to the lens from outside of the lens barrel through the opening formed in the circumference of the lens barrel.

Thus, the lens subject to the adjustment can be rotated without detaching the lens from the lens barrel, and it is possible to simplify the adjustment since the optimum position can be found while the image quality of the lens is being observed.

For the reasons stated above, the present invention reduces the number of processes for assembling the lens assembly and makes the lens performance uniform. The eccentricity of the lens can be adjusted easily without disassembling the lens barrel, and the eccentricity can be readjusted easily.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens barrel comprising:.

a lens;

a tilting mechanism for supporting the lens tiltably with respect to an optical axis;

wherein the tilting mechanism adjusts a tilt angle of the lens from the outside of the lens barrel; and wherein the lens is arranged in a cylindrical member;

a reference member and a plurality of eccentric members for supporting the lens from the outside are provided on the circumference of the cylindrical member; and connecting parts for connecting to the reference member and the eccentric members are formed at the outer circumference of the lens, the tilting mechanism being able to adjust the tilt angle of the lens by moving the eccentric members.

2. The lens barrel as defined in claim 1, wherein a projecting part is formed at the circumference of the lens, the projecting part coming into contact with the inner circumference of the cylindrical member.

3. The lens barrel as defined in claim 1, wherein an elastic member is disposed between the lens and the cylindrical member to eliminate a looseness of the lens with respect to the reference member and the eccentric members.

4. The lens barrel as defined in claim 1, wherein the lens is allowed to be inserted into and extracted from the cylindrical member while the reference member and the eccentric members are projecting from the inner circumference of the cylindrical member.

5. The lens barrel as defined in claim 1, wherein the lens has an effect on a resolution in a lens optical system in the lens barrel.

6. A lens barrel, comprising:

a lens supported rotatably about an optical axis;

an opening formed at the circumference of the lens barrel;

a power transmission mechanism for transmitting a force, applied from the outside of the lens barrel, to the lens through the opening to thereby adjust an eccentricity of the lens;

an eccentricity adjustment apparatus comprising:

a supporting base attached to the circumference of the lens barrel;

a rotary member rotatably supported on the supporting base; and wherein the power transmission mechanism transmits a rotational force of the rotary member to the lens through the opening of the lens barrel. and rottaes the lens in acordance with the rotated amount of the rotary member.

connecting parts for connecting to the reference member and the eccentric members are formed at the outer circumference of the lens the tilting mechanism being able to adjust the tilt angle of the lens by moving the eccentric members.

7. The lens barrel as defined in claim 6, wherein:

the opening is formed along the circumference of the lens barrel;

at least one connecting part is formed on the circumference of the lens;

a control member is connected to and disconnected from the lens in such a manner that the control member is inserted into and extracted from the connecting part through the opening; and the eccentricity of the lens is adjusted by moving the control member connected to the connecting part along the opening.

* * * * *